(12) United States Patent
Hillen et al.

(10) Patent No.: US 9,498,839 B2
(45) Date of Patent: Nov. 22, 2016

(54) WELDING APPARATUS WITH AUTOMATED WELDING WIRE RETRACTION

(71) Applicant: Lincoln Global, Inc., City of Industry, OH (US)

(72) Inventors: Edward Hillen, Painesville, OH (US); David Kempert, Willoughby, OH (US); Joe Daniel, Sagamore Hills, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 887 days.

(21) Appl. No.: 13/760,380

(22) Filed: Feb. 6, 2013

(65) Prior Publication Data

US 2013/0146575 A1    Jun. 13, 2013

Related U.S. Application Data

(63) Continuation-in-part of application No. 13/370,652, filed on Feb. 10, 2012, now abandoned, which is a continuation-in-part of application No. 12/967,667, filed on Dec. 14, 2010.

(51) Int. Cl.
 *B23K 9/12*    (2006.01)
 *B23K 9/095*   (2006.01)
 (Continued)

(52) U.S. Cl.
 CPC .............. *B23K 9/125* (2013.01); *B23K 9/095* (2013.01); *B23K 9/1043* (2013.01); *B23K 9/1336* (2013.01); *B23K 9/295* (2013.01); *B23K 9/32* (2013.01)

(58) Field of Classification Search
 CPC ...... B23K 9/125; B23K 9/095; B23K 9/032; B23K 9/1336; B23K 9/295; B23K 9/1043

USPC ............... 219/60.2, 121.54, 124.03, 130.01, 219/130.2, 130.21, 137.71

See application file for complete search history.

(56) References Cited

U.S. PATENT DOCUMENTS

| 1,840,735 A | 1/1932 | Osborne |
| 2,073,603 A | 3/1937 | Seckman |

(Continued)

FOREIGN PATENT DOCUMENTS

| CN | 2871090 | 2/2007 |
| DE | 3609877 A1 | 9/1987 |

(Continued)

OTHER PUBLICATIONS

International Search Report & Written Opinion for corresponding application PCT/IB2013/00165 dated Nov. 21, 2013.

(Continued)

*Primary Examiner* — Thien S Tran
(74) *Attorney, Agent, or Firm* — Perkins Coie LLP

(57) ABSTRACT

A method providing a welding apparatus configured to supply a welding wire to a welding gun and a welding system implementing the same is described. The welding gun has a trigger and an opening where the welding wire extends when the trigger is activated. The method also has a computer with a user interface that includes an automatic wire retract program, the program dynamically adjusting the amount of welding wire retraction based at least upon one of the following: welding arc current, welding wire size, welding wire speed and burnback time. The program monitors the welding gun and determines when the trigger is disabled. The program indicates when a first condition is satisfied and retracts the welding wire so the welding wire preferably does not extend (or minimally extends—or may be at least partially recessed within the tip) from the opening of the welding gun nozzle tip.

22 Claims, 10 Drawing Sheets

(51) Int. Cl.
*B23K 9/10* (2006.01)
*B23K 9/133* (2006.01)
*B23K 9/29* (2006.01)
*B23K 9/32* (2006.01)

(56) References Cited

U.S. PATENT DOCUMENTS

| | | | |
|---|---|---|---|
| 2,163,863 A | | 6/1939 | Biederman |
| 2,498,905 A | | 2/1950 | Abbott |
| 2,628,302 A | | 2/1953 | Tyrner |
| 2,731,536 A | | 1/1956 | Laur |
| 3,068,351 A | | 12/1962 | Longenecker |
| 3,141,085 A | | 7/1964 | Manz |
| 3,277,269 A | | 10/1966 | Zeller |
| 3,546,415 A | * | 12/1970 | Marantz ............... B05B 7/224 219/136 |
| 3,777,110 A | | 12/1973 | Yohn et al. |
| 4,283,617 A | | 8/1981 | Merrick et al. |
| 4,935,598 A | | 6/1990 | Ward |
| 5,191,185 A | | 3/1993 | John, Jr. et al. |
| 5,275,336 A | | 1/1994 | Stasi et al. |
| 5,332,342 A | | 7/1994 | Kizaki et al. |
| 5,916,464 A | | 6/1999 | Geiger |
| 6,160,241 A | * | 12/2000 | Stava ............... B23K 9/0216 219/130.21 |
| 6,720,529 B2 | | 4/2004 | Davidson et al. |
| 6,742,719 B2 | | 6/2004 | Tudor et al. |
| 2005/0127862 A1 | * | 6/2005 | Glasgow ........... B05C 17/00503 318/280 |
| 2006/0131293 A1 | | 6/2006 | Kaufman |
| 2008/0149608 A1 | | 6/2008 | Albrecht |
| 2011/0309061 A1 | * | 12/2011 | Rozmarynowski .... B23K 9/125 219/130.1 |
| 2012/0199566 A1 | | 8/2012 | Hillen et al. |
| 2013/0146575 A1 | | 6/2013 | Hillen et al. |

FOREIGN PATENT DOCUMENTS

| | | |
|---|---|---|
| GB | 759122 | 10/1956 |
| JP | 2000202629 | 7/2000 |
| JP | 2007021542 A | 2/2007 |
| JP | 2007260757 | 10/2007 |
| WO | 2011159730 A1 | 12/2011 |
| WO | 2012080796 A1 | 6/2012 |
| WO | 2013117987 A | 8/2013 |

OTHER PUBLICATIONS

International Search Report & Written Opinion for corresponding application PCT/IB2013/00165 dated Jun. 28, 2013.
International Search Report & Written Opinion for corresponding application PCT/IB2013/00165 dated Apr. 8, 2014.
The NeXt Generation of Automated Welding Systems and Stand-alone Components, http://www.ametinc.com/brochures/AMET_XM%20Brochure.pdf dated Dec. 9, 2010.
Cold wire feeders, CL Worldwide, http://ckworldwide.com/coldwire.htm dated Dec. 9, 2010.
PCT/IB2011/002911 International Search Report.
PCT/IB2011/002911 Written Opinion of International Search Authority.

* cited by examiner

WELDING APPARATUS WITH AUTOMATED WELDING WIRE RETRACTION

CROSS-REFERENCE TO RELATED APPLICATIONS

This application is a continuation-in-part of pending patent application Ser. No. 13/370,652 filed 10 Feb. 2012, which is a continuation-in-part of pending patent application Ser. No. 12/967,667 filed 14 Dec. 2010, the patent applications hereinby fully incorporated by reference.

TECHNICAL FIELD

The invention described herein relates generally to an automated wire retract method for a welding apparatus. Additionally, the invention relates to retrofitting or modifying a welding apparatus to include an automatic wire retract method.

BACKGROUND OF THE DISCLOSURE

Welding apparatus are configured to be operated by welders and other personnel. Often, this welding equipment includes welding wire feeders that advance welding wire to a welding gun when a welder activates a welding gun trigger (e.g., by squeezing the trigger or by depressing a foot pedal). After welding, a pointed end of the welding wire extends from the tip of the welding gun, possibly exposing welders and other personnel to a potentially unsafe condition.

In view of the foregoing problems and shortcomings of existing welding apparatus, the present application describes a system and method to overcome these shortcomings.

SUMMARY OF THE DISCLOSURE

In one aspect of the invention, an automatic wire retract method is described comprising at least the following steps: providing a manual welding apparatus having at least a welding power source, a wire feeder configured to supply a welding wire, and a welding gun having a trigger and an opening from which the welding wire extends; providing an automatic wire retract program having a retract delay time; configuring the manual welding apparatus to include the automatic wire retract program; monitoring when the trigger is enabled to extend the welding wire from the wire feeder to the opening, and extending the welding wire out of the opening of the welding gun; determining a first amount of time when the trigger is disabled; determining when the first amount of time is at least equal to the retract delay time, wherein the trigger is disabled during the first amount of time; and at least partially retracting the welding wire into the opening of the welding gun for a retract distance or a retract time, said step of at least partially retracting dynamically based upon at least one of the following parameters: welding arc current, welding wire size, welding wire speed and burnback time. The first amount of time, i.e., the delay time is a user defined amount of time based typically upon historical operator welding characteristics, and may be unique for each welding operation. The second amount of time, i.e., the retract time is a dynamically adjusted value based upon the characteristics of the welding operation being employed. The amount of retraction is at least a partial retraction from the contact tip to work distance ("CTWD"), and may result, depending on the characteristics of the welding operation and welding gun configuration, in a complete retraction within the gun tip, or essentially coextensive with the welding gun tip, or even partially extending beyond the welding gun tip, but at a distance which is less than the CTWD during the welding operation.

It should be recognized that while the term "trigger" is employed in this patent application, it is intended to include foot pedal operations, in which the activating mechanism is not physically present on the welding gun body.

In another aspect of the invention, a method is described which includes at least the following steps: providing a manual welding apparatus configured to supply a welding wire to a welding gun, wherein the welding gun has a trigger and an opening where the welding wire extends when the trigger is activated; providing a computer with a user interface that includes an automatic wire retract program; monitoring the welding gun; determining when the trigger is in either an enabled or disabled position during said step of monitoring; performing a comparison using the automatic wire retract program to indicate when a first condition is satisfied after determining that said trigger is in a disabled position; and at least partially retracting the welding wire after said comparison, said step of at least partially retracting dynamically based upon at least one of the following parameters: welding arc current, welding wire size, welding wire speed and burnback time.

In still yet another aspect of the invention, a method is described to improve the safety of a welding operation using a welding torch which employs a trigger to advance a welding wire, comprising the steps of: depressing said trigger to advance said welding wire to initiate a welding operation; releasing said trigger to stop said advancement of said welding wire; detecting that said trigger is in a released position; waiting for a first period of time; comparing said first period of time to a predefined waiting time; at least partially retracting said welding wire when said first period of time exceeds said predefined waiting time; and continuing said step of at least partially retracting for a second period of time, said step of continuing said step of at least partially retracting dynamically based upon at least one of the following parameters: welding arc current, welding wire size, welding wire speed and burnback time.

In a further aspect of the invention, a welding system is described which includes at least the following: a welding power source; a wire feeder; a welding gun in operative communication with said wire feeder, said welding gun having a means to control said wire feeder; a wire retract program in operative communication with said wire feeder, said wire retract program comprising: a detection means for determining when said means to control said wire feeder has communicated a signal to said wire feeder to stop feeding said wire; a comparator for measuring elapsed time between said signal to stop feeding said wire and a present time; and said program operatively communicating a signal to said wire feeder to at least partially retract said wire after said comparator determines that said elapsed time has exceeded a preset time, said step of at least partially retracting dynamically based upon at least one of the following parameters: welding arc current, welding wire size, welding wire speed and burnback time.

In a still further aspect of the invention, a welding system is described which includes at least the following: a welding power source; a wire feeder; a welding gun in operative communication with said wire feeder, said welding gun having a means to control said wire feeder; a wire retract program in operative communication with said wire feeder, said wire retract program comprising: a detection means for determining when said means to control said wire feeder has communicated a signal to said wire feeder to stop feeding said wire; and said program operatively communicating a signal to said wire feeder to at least partially retract said wire after said signal to said wire feeder to stop feeding said wire after a predefined a preset time, said step of at least partially retracting dynamically based upon at least one of the following parameters: welding arc current, welding wire size, welding wire speed and burnback time.

While a welding stoppage delay is typically preferred, it is not always essential and the invention encompasses a process of using a welding torch which employs a trigger to advance a welding wire, comprising the steps of: depressing said trigger to advance said welding wire to initiate a welding operation; releasing said trigger to stop said advancement of said welding wire; detecting that said trigger is in a released position; at least partially retracting said welding wire after detecting that said trigger is in a released position; and said step of at least partially retracting dynamically based upon at least one of the following parameters: welding arc current, welding wire size, welding wire feed rate and burnback time.

In combination with the above, a system is described in which A welding system comprising: a welding power source; a wire feeder; a welding gun in operative communication with said wire feeder, said welding gun having a means to control said wire feeder; a wire retract program in operative communication with said wire feeder, said wire retract program comprising: a detection means for determining when said means to control said wire feeder has communicated a signal to said wire feeder to stop feeding said wire; and said program operatively communicating a signal to said wire feeder to at least partially retract said wire after said wire feeder has stopped feeding said wire, said wire retract program retracting dynamically for a distance which approximates an electrode stick out distance based upon at least one of the following parameters: welding arc current, welding wire size, welding wire feed rate and burnback time.

Also within the scope of the invention is a method of locating a welding apparatus that does not have an automatic wire retract program and providing a means for modifying the welding apparatus so that the automatic wire retract program is enabled.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE DRAWINGS

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. As used herein, the following terms will have the following meanings The term "contact tip to work distance" or "CTWD" means a distance between the contact tip end e.g., 144a as illustrated in FIG. 9 and the horizontal plane of the workpiece at the weld site.

Figure 9:
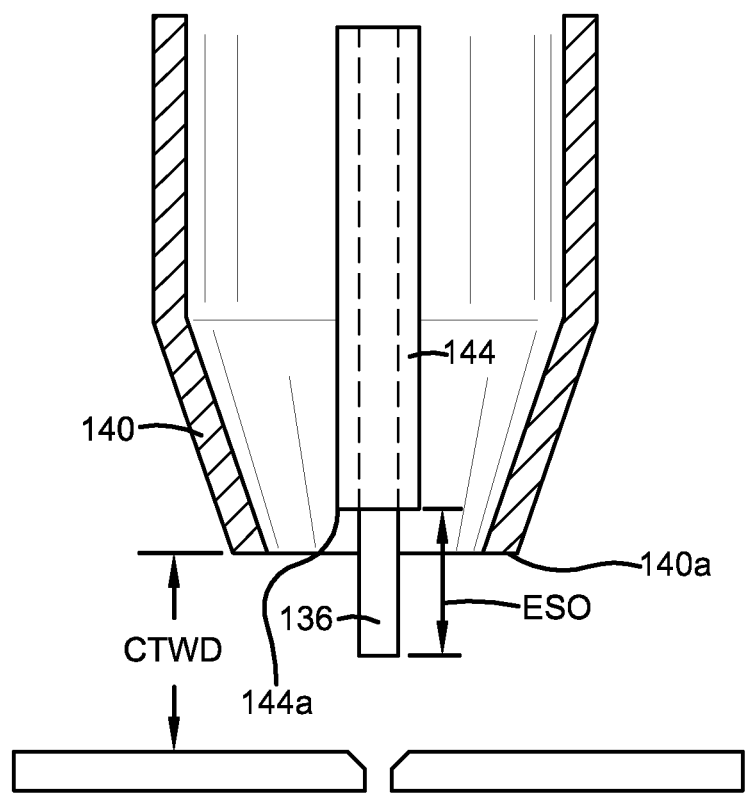
FIG. 9 is an illustration of contact tip to work distance ("CTWD") and electrode stick out ("ESO")

The term "electrode stick out" or "ESO" means a distance between the contact tip end, e.g., 144a and the terminal tip of the electrode 136 as illustrated in FIG. 9.

The term "proximate" means a measurement deviation from the horizontal plane of the nozzle end or contact tip end of no more than about 0.125 inches.

Figure 1:
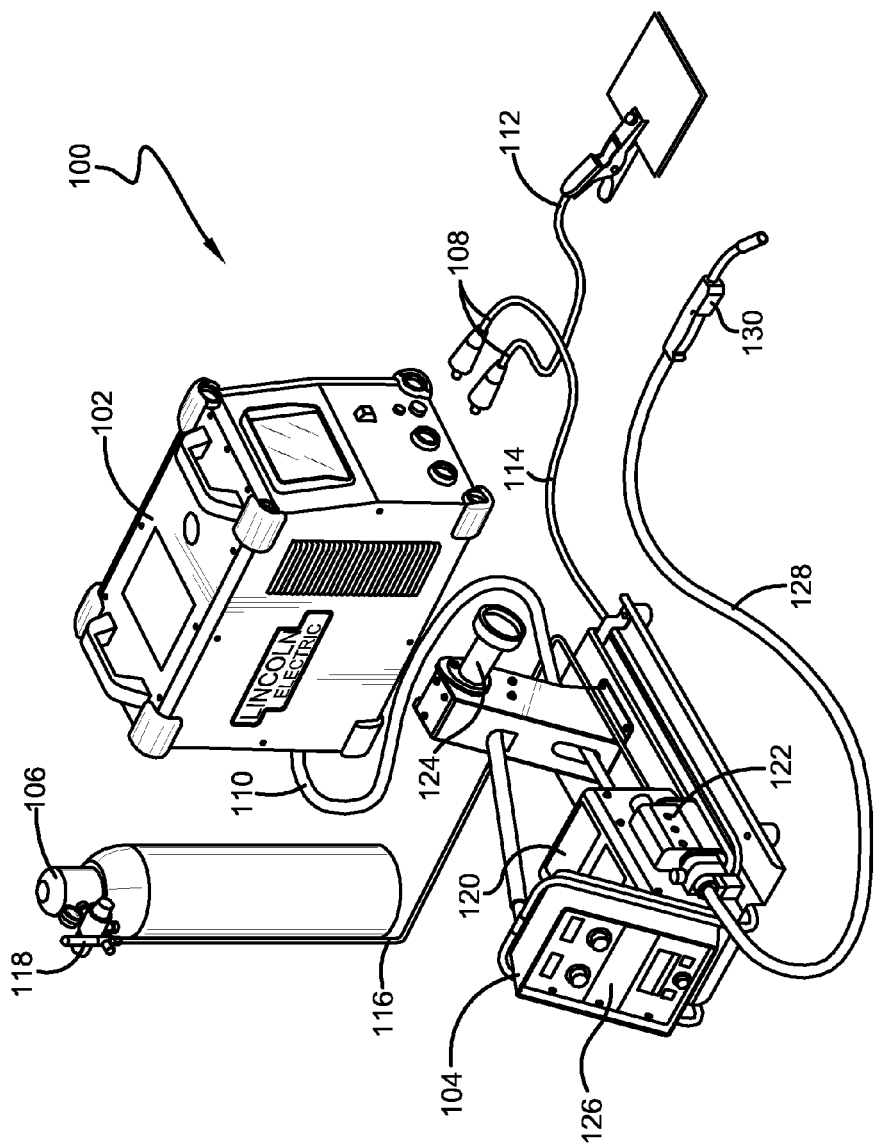
FIG. 1 is a perspective view of a welding apparatus.

Referring now to the drawings wherein the showings are for purposes of illustrating the preferred embodiment of the invention only and not for purposes of limiting the same, as illustrated in FIG. 1, welding apparatus 100 includes welding power source 102, wire feeder 104, and gas supply 106. Welding power source 102 includes power cables 108, control cable 110, and power supply cable (not shown). Power cables 108 include a ground wire and clamp 112 connected to a work piece and power cable 114 configured to connect to wire feeder 104. Control cable 110 may be configured to connect to wire feeder 104. In another embodiment (not shown), control cable 110 may be configured to be wireless. It is understood that welding power source 102, power cables 108, and control cable 110 can have any configuration suitable for supplying power and welding controls to the welding apparatus 100.

Further illustrated in FIG. 1, gas conduit 116 and regulator 118 are configured to connect gas supply 106 to wire feeder 104. Gas supply 106 may include inert gases, active gases, or a combination of both, including but not limited to argon, helium, carbon dioxide, argon and helium, argon and hydrogen, and other gas combinations. In another embodiment (not shown), welding apparatus 100 uses welding wire that is coated with a material that forms a gas shield when burned, therefore, a gas supply may not be necessary in all embodiments. It is understood that the gas supply may be any gas or combination of gases configured to shield a weld from the atmosphere.

As shown in FIG. 1, wire feeder 104 may include housing 120, gear box 122, wire spool assembly 124, and user interface 126. Extending from gear box 122 is hose 128 that is configured to connect to welding gun 130. Housing 120 may be connected to user interface 126 and gear box 122. Further, control cable 110 and power cable 114 extending from welding power source 102 and gas conduit 116 extending from gas supply 106 are configured to connect to housing 120, gear box 122, and hose 128. Gear box 122 includes at least a plurality of rollers (not shown) that advance and retract the welding wire (not shown) and a wire guide (not shown) that controls the path of the welding wire.

It is understood that wire feeder 104 may have any configuration suitable for receiving a gas supply, a power supply, and welding controls.

Extending between gear box 122 and welding gun 130 is hose 128 which operatively connects the welding wire and wire conduit, a gas line (if required), and a welding gun trigger switch connection. In another embodiment (not shown), as discussed above, hose 128 does not include a gas line. In yet another embodiment (not shown), hose 128 may include a control cable configured to connect welding gun 130 to at least one of the following: welding power source 102, wire feeder 104, and gas supply 106. Hose 128 can be any diameter and length configured to contain the welding wire, the gas hose, and the switch connection. Hose 128 is made of any material suitable for welding environments. It is understood that hose 128 and welding gun 130 may have any configuration suitable for supplying welding wire, welding gas, and controls through the hose and to the welding gun.

In the illustrated embodiment of welding apparatus 100, user interface 126 includes at least one of the following: a control system, a computer (or optionally at least a CPU) with sufficient processing capabilities to implement and/or run a software program and a setup program. For example, user interface 126 on welding apparatus 100 includes an automatic wire retract program configured to reverse gear box 122 on wire feeder 104 so exposed welding wire (not shown) at least partially retracts from an opening or an end of the welding gun. The automatic wire retract program is designed to prevent a welder from being exposed to a potentially sharp end of the welding wire that may stick out or extend beyond the opening or the end of welding gun 130. The automatic wire retract program can be password protected so that supervisors and other management personnel can maintain control of the automatic wire retract program.

In one initial embodiment of the invention described in the parent application, the automatic wire retract program compared a time delay between a welder discontinuing use of welding apparatus 100 for more than a preset first amount of time and upon either meeting and/or exceeding the preset delay time, the automatic wire retract program at least partially retracted the welding wire from the opening or the end of the welding gun for a second amount of time (reversal time). For example, user interface 126 included a first setting where a retract delay time was set and a second setting where a wire retract time was set. After these settings were made, if a welder discontinues use of the apparatus for an amount of time greater than or equal to the specified first amount of time, the wire feeder retracted the welding wire for the second amount of time (or equivalently distance as illustrated below).

In another initial embodiment of the invention described in the parent application, the automatic wire retract program was configured to retract the welding wire from the opening or the end of the welding gun for a predetermined and fixed distance when a welder discontinued use of the welding apparatus 100 for more than the first amount of delay time. For example, user interface 126 included a first setting where the retract delay time was set and a second setting where the retract distance was set.

In yet another initial embodiment of the invention described in the parent application, upon a welder discontinuing use of welding apparatus 100 for more than the first amount of time, the automatic wire retract program was configured to at least partially retract the welding wire from the opening or the end of the welding gun until a sensor system (not shown) indicated that the end of the welding wire is in a safe zone (not shown) within welding gun 130. For example, automatic wire retract program retracted the welding wire until the sensor was activated, wherein the sensor indicates that the end of the welding wire is contained within the nozzle, the tip (not shown), or both the nozzle and tip. Automatic wire retract methods for welding apparatuses will be further discussed below. It is understood that the user interface and the automatic wire retract program may be configured in any way so that the end of the welding wire in a welding apparatus at least partially retracts into a portion of the welding gun, e.g., a tip and a nozzle, so a welder is not exposed to a potentially sharp welding wire.

Figure 2:
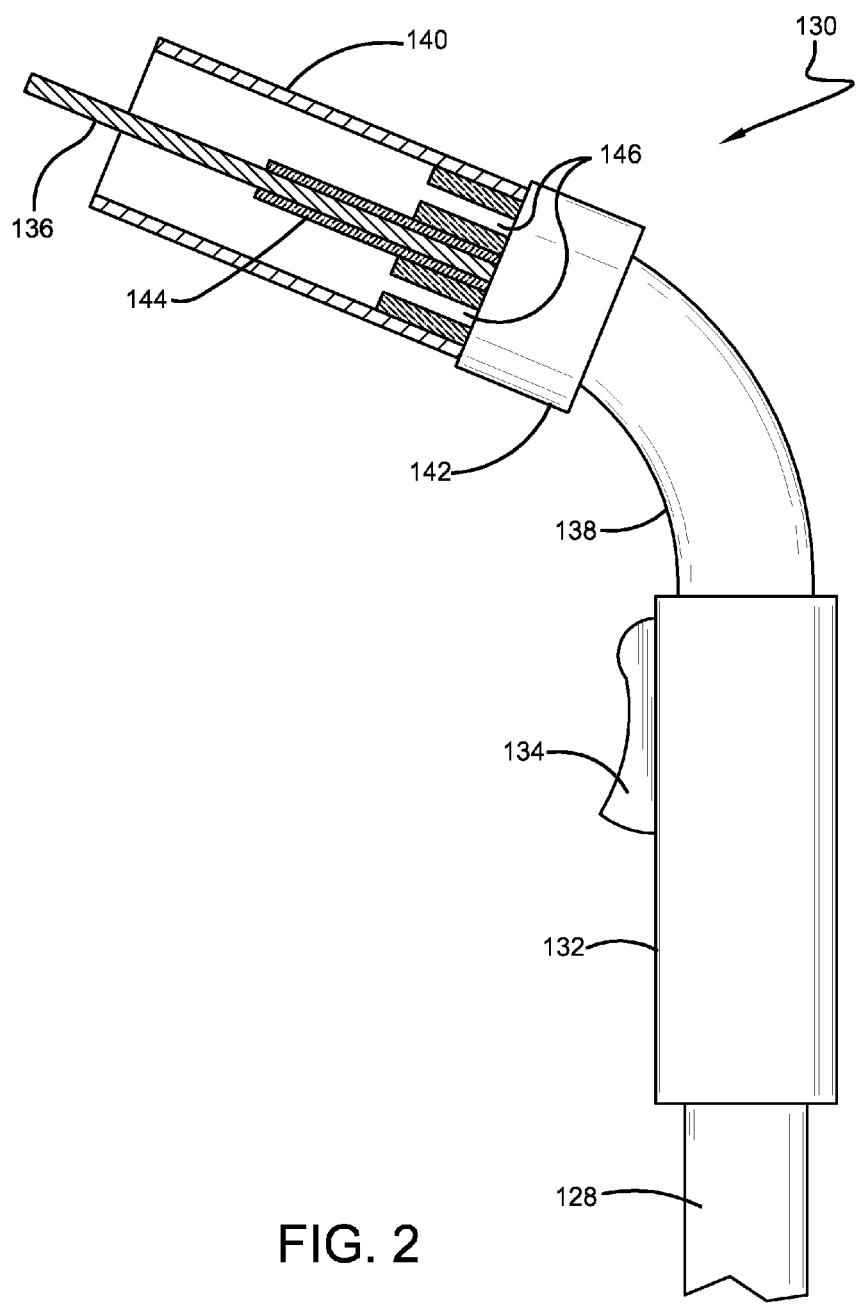
FIG. 2 is a side view of a welding gun of FIG. 1.

As shown in FIG. 2, hose 128 is configured to connect to welding gun 130 in proximity to welding gun handle 132. Trigger 134 on handle 132 is configured to advance welding wire 136 from the gear box of the wire feeder (not shown) through hose 128 and handle 132, and further along neck 138 and nozzle 140. Nozzle 140 is configured to removably attach to neck 138. In addition, trigger 134 may be configured to control welding shielding gas. For example, welding wire 136 extends from nozzle 140 and welding shielding gas surrounds welding wire when a welder actuates trigger 134 (i.e., moves the trigger from a default inactive position typically with the trigger fully extended to an activated position typically with the trigger fully, or at least partially, depressed). In another embodiment (not shown), neck 138 may have a longer or shorter length and may bend at a different angle than what is shown in FIG. 2. It is understood that welding gun 130 may have any configuration suitable for a welder to control the advancement of the welding wire and the supply of the welding shielding gas.

As illustrated in FIG. 2 nozzle 140 include insulating boss 142 in one embodiment, that is configured to prevent heat and electrical contact from transferring from nozzle 140 to at least one of the following: neck 138 and welding gun handle 132. Inside nozzle 140, tip 144 is configured to removably attach to neck 138. Tip 144 is further configured to guide welding wire 136 along a center of nozzle 140 and to allow welding gas to emit from gas passages 146 to shield welding wire 136 from the surrounding environment. In another embodiment (not shown), the welding gun includes handle 132, trigger 134, neck 138, tip 144, and gas passages 146. In this configuration, welding gun 130 does not include nozzle 140. It is understood that nozzle 140 may have any configuration suitable for a welder to control the welding wire and the supply of a welding shielding gas.

Figure 3A:
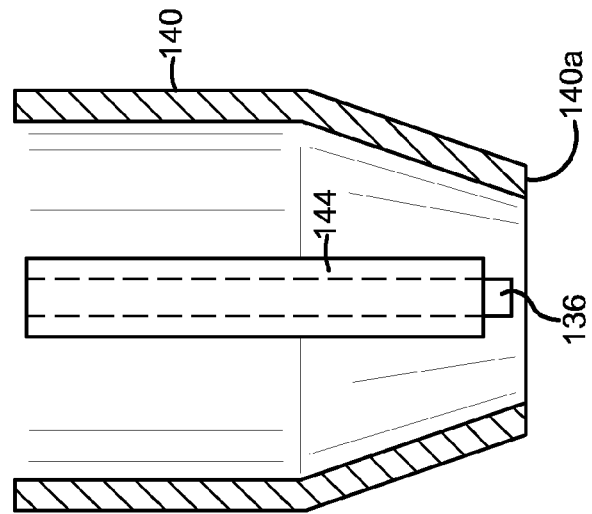
FIGS. 3a-3c are enlarged cross sectional views through the nozzle of FIG. 2.
Figure 3B:
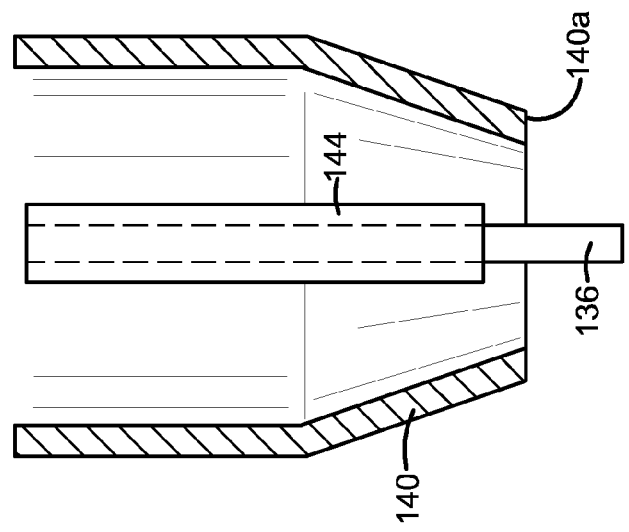
Figure 3C:
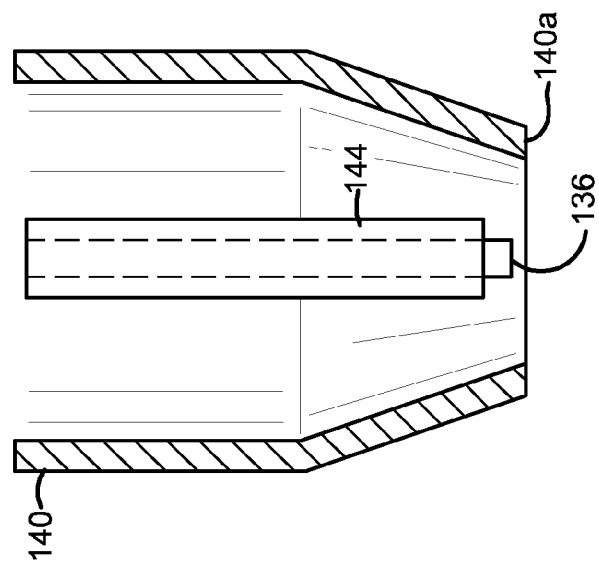

FIGS. 3a-3c are enlarged cross-sectional views of nozzle 140 of FIG. 2 where tip 144 is configured to be within end 140a of nozzle 140. The series of FIGS. 3a-3c illustrate an example of how welding apparatus 100 is configured to operate when using the automatic wire retract program. For purposes of this example, FIG. 3a shows a cross-section of the nozzle 140 for an initial welding condition before a welder uses the welding apparatus 100. FIG. 3a shows nozzle 140 having welding wire 136 extending from tip 144, wherein welding wire 136 and tip 144 are completely within end 140a of nozzle 140. FIG. 3b shows a nozzle cross-section after a welder uses welding apparatus 100. As shown in FIG. 3b, welding wire 136 extends beyond end 140a of nozzle 140, potentially exposing the welder to an end of the welding wire 136. By enabling the automatic wire retract program through the user interface 126, welding apparatus 100 is configured to automatically retract the end of welding wire 136 within end 140a of nozzle 140 when a welder stops welding for a specified amount of time, as illustrated in FIG. 3c. For example, if a welder stops welding for 20 seconds, the automatic wire retract program would retract the welding wire so it is not exposed to the welder. In another embodiment (not shown), the nozzle and tip can be longer or shorter than what is illustrated in FIGS. 3a-3c. It is understood that welding apparatus 100 may be configured with the automatic wire retract program so that the welding wire retracts at least within end 140a of the nozzle 140 when a welder stops welding for a specified amount of time. The times mentioned above are for illustrative purposes only and both larger and shorter periods of time are within the scope of this invention. While a complete retraction of welding wire 136 is illustrated, the invention encompasses embodiments when the welding wire is only partially retracted from its extended state illustrated in FIG. 3b. In this aspect of the invention, the welding wire may still extend beyond end 140a, but not as far as illustrated in FIG. 3b.

Figure 4A:
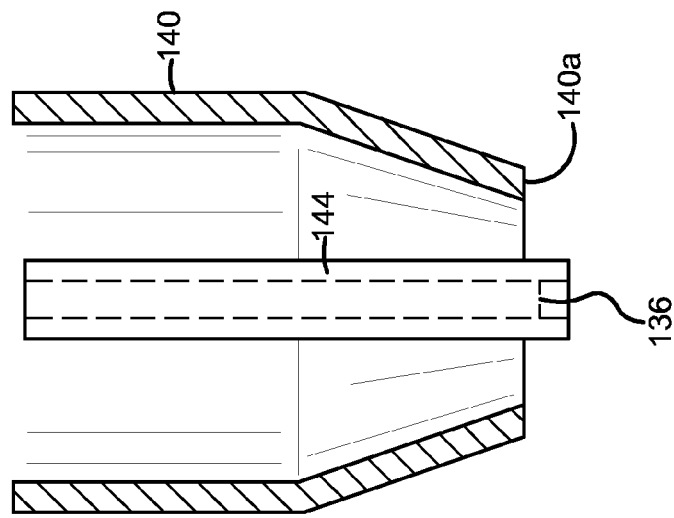
FIGS. 4a-4c are enlarged cross sectional views of another nozzle embodiment.
Figure 4B:
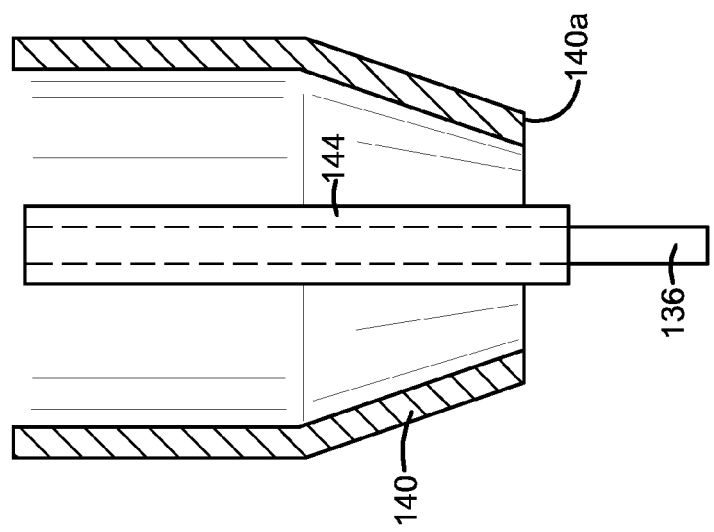
Figure 4C:
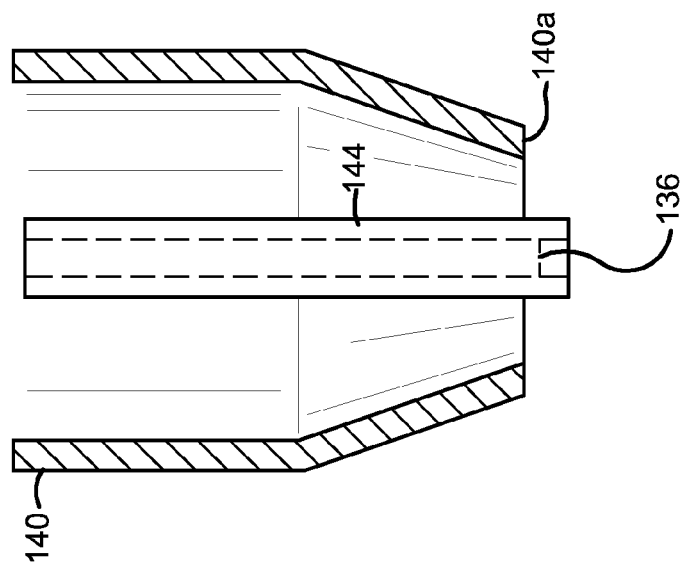

FIGS. 4a-4c are enlarged cross-sectional views of nozzle 140 of FIG. 2 where tip 144 is configured to extend past end 140a of nozzle 140. Similar to the series of FIGS. 3a-3c above, the series of FIGS. 4a-4c illustrate an example of how welding apparatus 100 is configured to operate when using the automatic wire retract program. Again, for purposes of this example, FIG. 4a shows a cross section of nozzle 140 for an initial welding condition before a welder uses welding apparatus 100. FIG. 4a shows nozzle 140 and tip 144, wherein welding wire is not extending from tip 144 and tip 144 extends past end 140a of nozzle 140. FIG. 4b shows a nozzle cross-section after a welder uses welding apparatus 100. As shown in FIG. 4b, welding wire 136 extends from the end of tip 144, potentially exposing the welder to an end of welding wire 136. By enabling the automatic wire retract program through user interface 126, welding apparatus 100 is configured to automatically retract the end of welding wire 136 within the end of tip 144 when a welder stops welding for a specified amount of time, as illustrated in FIG. 4c. In another embodiment (not shown), the tip can be longer or shorter than what is illustrated in FIGS. 4a-4c. In a manner consistent with the description associated with FIGS. 3a-3c, total retraction of welding wire 136 is not required, but at least a partial retraction from the depiction illustrated in FIG. 4b is.

Figure 5C:
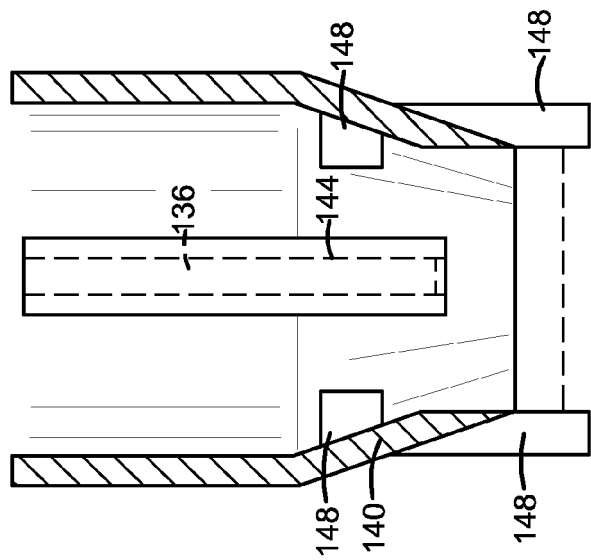
FIGS. 5a-5c are enlarged cross sectional views of yet another nozzle embodiment.
Figure 5B:
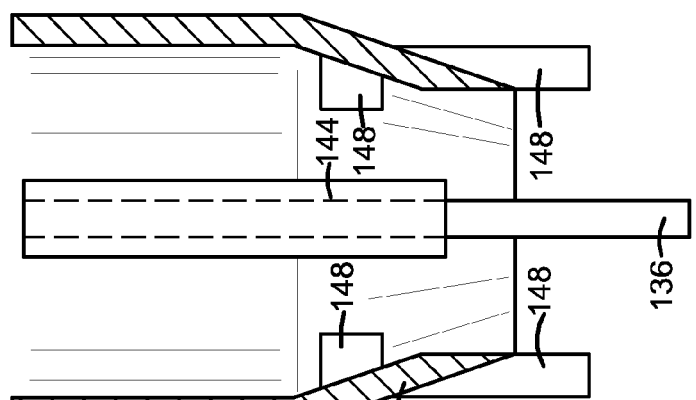
Figure 5A:
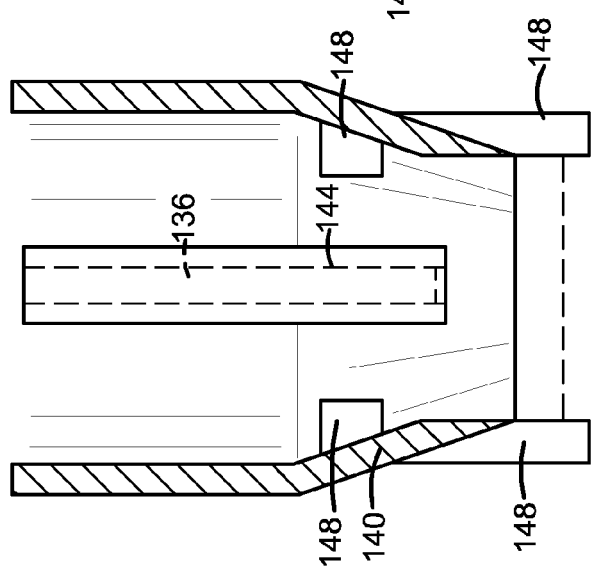

FIGS. 5a-5c are enlarged cross-sectional views of another embodiment of nozzle 140 of FIG. 2 where tip 144 is configured to be within end 140a of nozzle 140. Further, the nozzle includes at least one sensor 148 configured to indicate location of welding wire 136. The at least one sensor can include at least one of the following proximity sensors: mechanical, electrical, optical, laser, ultrasonic, and the like. The series of FIGS. 5a-5c illustrate an example of how welding apparatus 100 is configured to operate when using the automatic wire retract program with at least one sensor. FIG. 5a shows a cross section of nozzle 140 for an initial welding condition before a welder uses welding apparatus 100. FIG. 5a shows nozzle 140 and tip 144, wherein welding wire is not extending from tip 144 and the at least one sensor 148 does not sense welding wire 136. FIG. 5b shows a nozzle cross-section after a welder uses welding apparatus 100. As shown in FIG. 5b, welding wire 136 extends beyond the end of nozzle 140 and tip 144, potentially exposing the welder to an end of welding wire 136. By enabling the automatic wire retract program through user interface 126, welding apparatus 100 is configured to automatically retract the end of welding wire 136 within end 140a of nozzle 140 when a welder stops welding. The welding wire will retract until the welding wire activates the at least one sensor 148 indicating that the end of the welding wire is within nozzle 140 or within tip 144, as illustrated in FIG. 5c. In another embodiment (not shown), the tip can be longer or shorter than what is illustrated in FIGS. 5a-5c. In yet another embodiment (not shown), the number of sensors 148 can be a number less than or greater than the number illustrated in FIGS. 5a-5c. Consistent with the discussions associated with the previous figures, total retraction is not required, but at least a partial retraction from the fully extended position illustrated in FIG. 5b is an aspect of the invention.

Figure 6C:
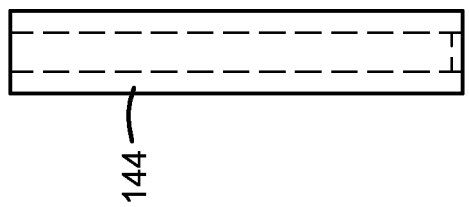
FIGS. 6a-6c are side views of a tip of an alternative welding gun.
Figure 6B:
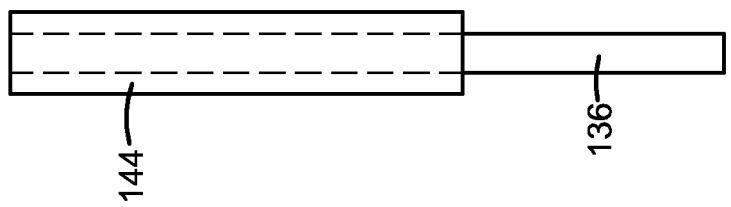
Figure 6A:
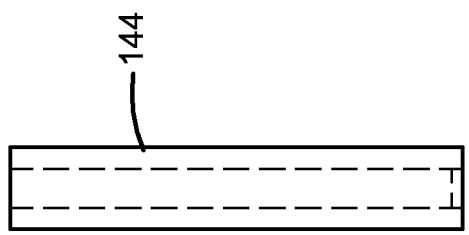

FIGS. 6a-6c are side views of tip 144 of an alternative welding gun where welding gun (not shown) does not include a nozzle so the entire tip 144 is exposed. The series of FIGS. 6a-6c illustrate an example of how welding apparatus 100 is configured to operate when using the automatic wire retract program. FIG. 6a shows a side view of tip 144 for an initial welding condition before a welder uses welding apparatus 100. FIG. 6a shows where the welding wire is not extending from exposed tip 144. FIG. 6b shows the side view of tip 144 after a welder uses welding apparatus 100. As shown in FIG. 6b, welding wire 136 extends from the end of tip 144, potentially exposing the welder to an end of welding wire 136. By enabling the automatic wire retract program through user interface 126, welding apparatus 100 is configured to automatically retract the end of welding wire 136 within the end of tip 144 when a welder stops welding for a specified amount of time, as illustrated in FIG. 6c. In another embodiment (not shown), the tip can be longer or shorter than what is illustrated in FIGS. 6a-6c consistent with previous discussions.

Figure 7:
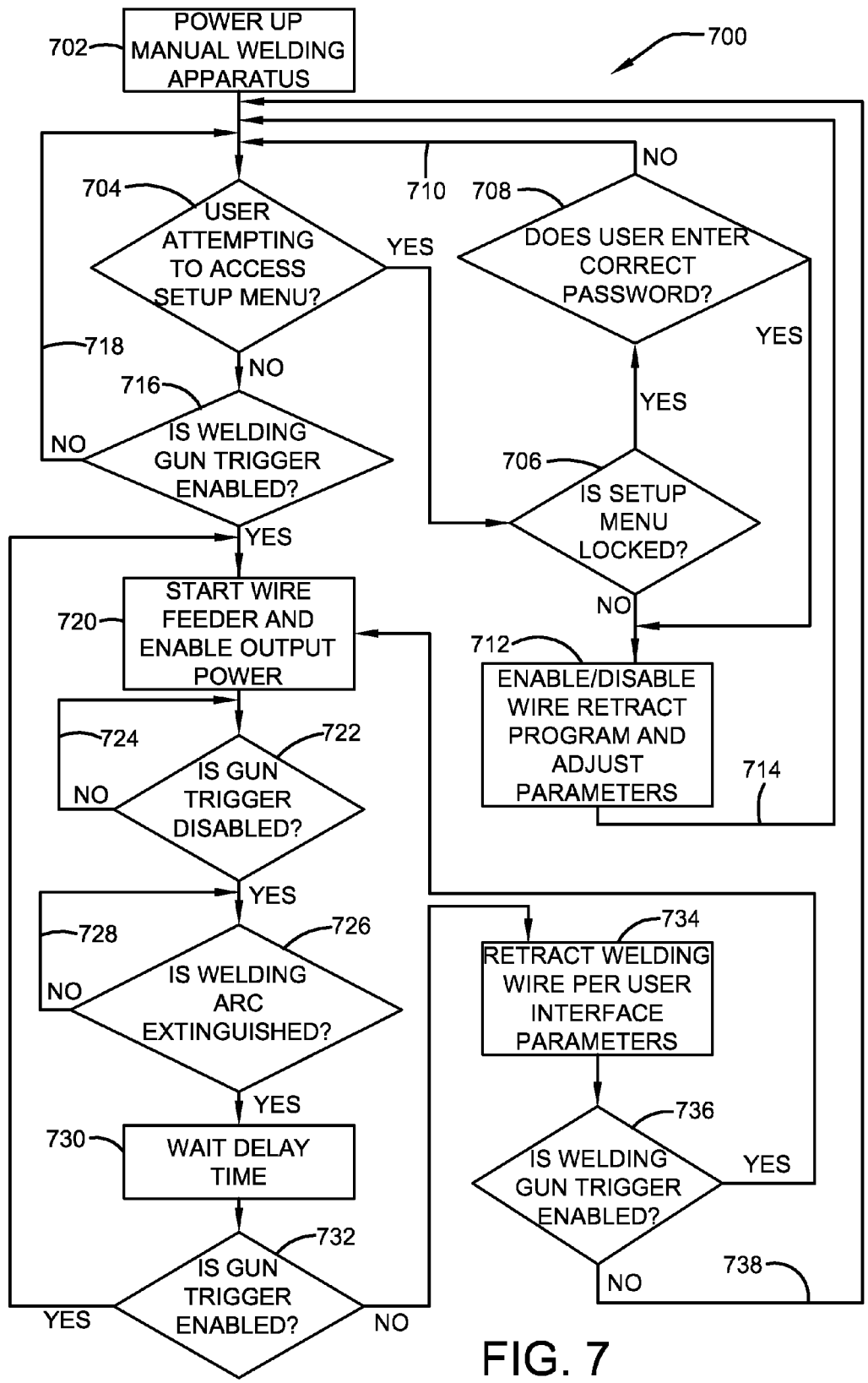
FIG. 7 is a flow chart illustrating one embodiment of an automatic wire retract method.

FIG. 7 is a flow chart illustrating one embodiment of an automatic wire retract method 700 for welding apparatus 100. As shown in FIG. 7, welding apparatus is configured to power up at 702. At 704, a computer having an automatic wire retract program determines whether a user is attempting to access the setup menu through the user interface or computer. If the user is attempting to access the setup menu at 704, the computer determines if the setup menu is locked at optional 706. If the setup menu is locked at optional 706, the computer determines if the user enters the correct password at 708. If the setup menu is locked and the user does not enter the correct password, the computer blocks access to the setup parameters and returns the user to a previous user interface option at 710. If the setup menu is locked and the user does enter the correct password, the computer allows the user access to the setup parameters to enable or disable the automatic wire retract program at 712. After the user enables or disables the automatic wire retract program and any related parameters, the computer returns the user to a previous user interface option at 714. For example, the user may adjust at least one of the following parameters, including: a retract delay time, a retract time, a retract distance, and proximity sensor parameters.

If the user is not attempting to access the setup menu at 704, the computer determines if the welding gun trigger is enabled at 716. If the welding gun trigger is not enabled and the welding apparatus has power, the computer waits until the welding gun trigger is enabled or the user attempts to access the setup menu at 718. If the welding gun trigger is enabled at 716, the wire feeder starts and the welding power source supplies power at 720. At 722, the computer determines if the welding gun trigger is disabled. If the welding gun trigger is not disabled, the computer monitors the welding gun trigger at 724. When the welding gun trigger is disabled at 722, the computer determines if the welding arc is extinguished at 726. If the welding arc is not extinguished at 726, the computer monitors the welding arc at 728.

When the welding arc is extinguished at 726, the computer tracks a wait time delay and determines if the wait time delay is greater than a retract delay time set in the user interface at 730. For example, the retract delay time can be any time greater than zero. If the wait time delay is less than the retract delay time set in the user interface, the computer continues to monitor the wait time delay. If the wait time delay is at least equal to the retract delay time set in the user interface, the computer checks to see that the welding gun trigger is enabled at 732. If the welding gun trigger is enabled at 732, the wire feeder starts and the welding power source supplies power at 720. If the welding gun trigger is not enabled at 732 and the wait time delay is at least equal to the retract delay time set in the user interface, the automatic wire retract program retracts the welding wire based on user interface parameters at 734. For example, the welding wire may retract for an amount of time or a specific distance. At 736, the computer determines if the welding gun trigger is enabled. If the welding gun trigger is enabled at 736, the wire feeder starts and the welding power source supplies power at 720. If the welding gun trigger is not enabled at 736, at 738 the computer returns to the beginning of the method at 704. It is important to note that it is possible to activate trigger during the retract delay time which would restart the welding operation, as if welding gun trigger is employed at 732. It is not necessary to wait for the full retract delay period before restarting welding.

In another embodiment of the method, the computer monitors the gear box drive motor on the wire feeder for excess current or torque, wherein the excess current or torque may indicate a problem with the automatic wire retract method. In any case, it must be understood that welding apparatus 100 using automatic wire retract method 700 may be configured so that the welding wire retracts at least within end 140a of nozzle 140 or tip 144 when a welder stops welding for a specified amount of time.

In yet another embodiment (not shown) of an automatic wire retract method 700 for welding apparatus 100, method 700 includes at least one of the following method steps. If a welding gun trigger is enabled, a wire feeder starts and a welding power source supplies power. A computer is configured to determine if the welding gun trigger is disabled. If the welding gun trigger is not disabled, the computer monitors the welding gun trigger. Alternatively, when the welding gun trigger is disabled, the computer determines if a welding arc is extinguished. If the welding arc is not extinguished, the computer monitors the welding arc. Once the welding arc is extinguished, the computer is configured to track a wait time delay and determine if the wait time delay is greater than a retract delay time set in the user interface. If the wait time delay is less than the retract delay time set in the user interface, the computer continues to count the wait time delay. If the wait time delay is at least equal to the retract delay time set in the user interface, the computer checks to see that the welding gun trigger is enabled. If the welding gun trigger is enabled, the wire feeder starts and the welding power source supplies power. If the welding gun trigger is not enabled and the wait time delay is at least equal to the retract delay time set in the user interface, the automatic wire retract program retracts the welding wire. Similar comments are applicable regarding the ability to restart the welding process during the retract delay time period.

Figure 8:
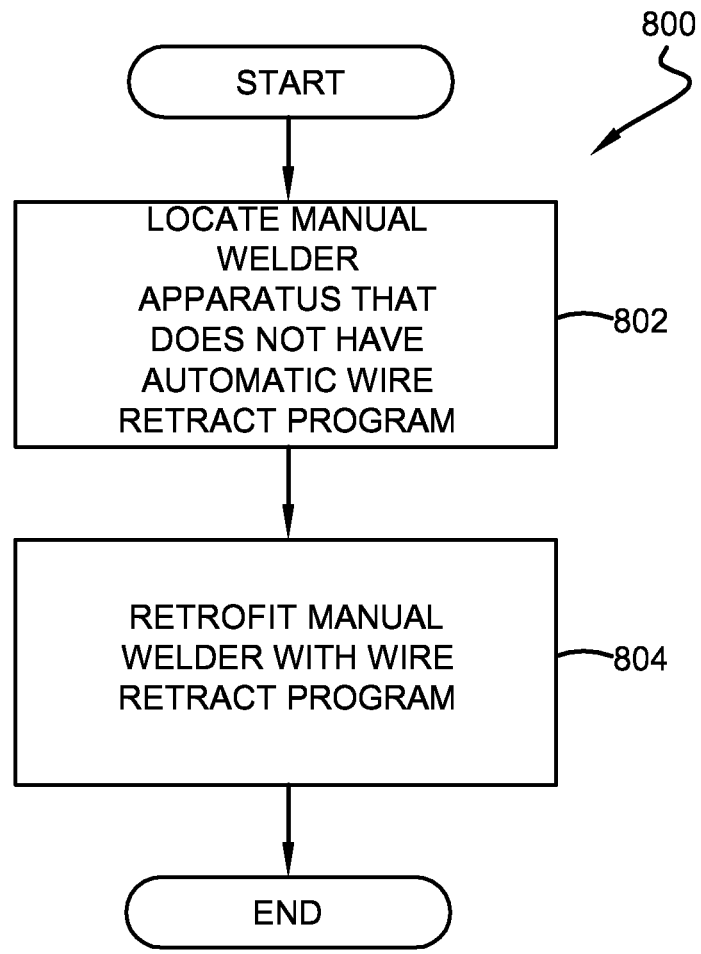
FIG. 8 is a flow chart illustrating a method for modifying a welding apparatus.

FIG. 8 is a flow chart illustrating one embodiment of an automatic wire retract method for a retrofit or modification of a welding apparatus. As shown in FIG. 8, a welding apparatus is located that does not have an automatic wire retract program at 802. At 804, a welding apparatus that has once been manufactured or sold is retrofit or modified with an automatic wire retract program. For example, at least one of the following is added to or modified in the welding apparatus, including: a software program, hardware, a relay, a printed circuit board, a wire harness, a user interface, and the like.

A computer or user interface 126 that may include a computer having an automatic wire retract program illustrates one possible hardware configuration to support the systems and methods described herein, including the methods 700 and 800 above. In order to provide additional context for various aspects of the present invention, the following discussion is intended to provide a brief, general description of a suitable computing environment in which the various aspects of the present invention may be implemented. Those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

User interface 126 associated with the automatic wire retract program can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within the computer, such as during start-up, is stored in the ROM.

The computer or the user interface 126 that may include a computer having an automatic wire retract program can further include a hard disk drive, a magnetic disk drive, e.g., to read from or write to a removable disk, and an optical disk drive, e.g., for reading a CD-ROM disk or to read from or write to other optical media. The computer or the user interface 126 that may include a computer having an automatic wire retract program can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the user interface 126.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the computer or the user interface 126 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with user interface 126 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the user interface 126 via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

As discussed hereinabove, the retract time or distance is fixed based upon user input typically through user interface 126 to the software retract program. However, while this represents an advance over the prior art, a dynamic retract time (or dynamic retract distance) based on wire size and/or wire speed and/or average current offers a superior solution. As with the previous solution, the retract time and/or distance does not require the welding wire tip to be fully retracted, but only to retract at least some distance from its fully extended distance upon cessation of a welding operation.

Figure 10:
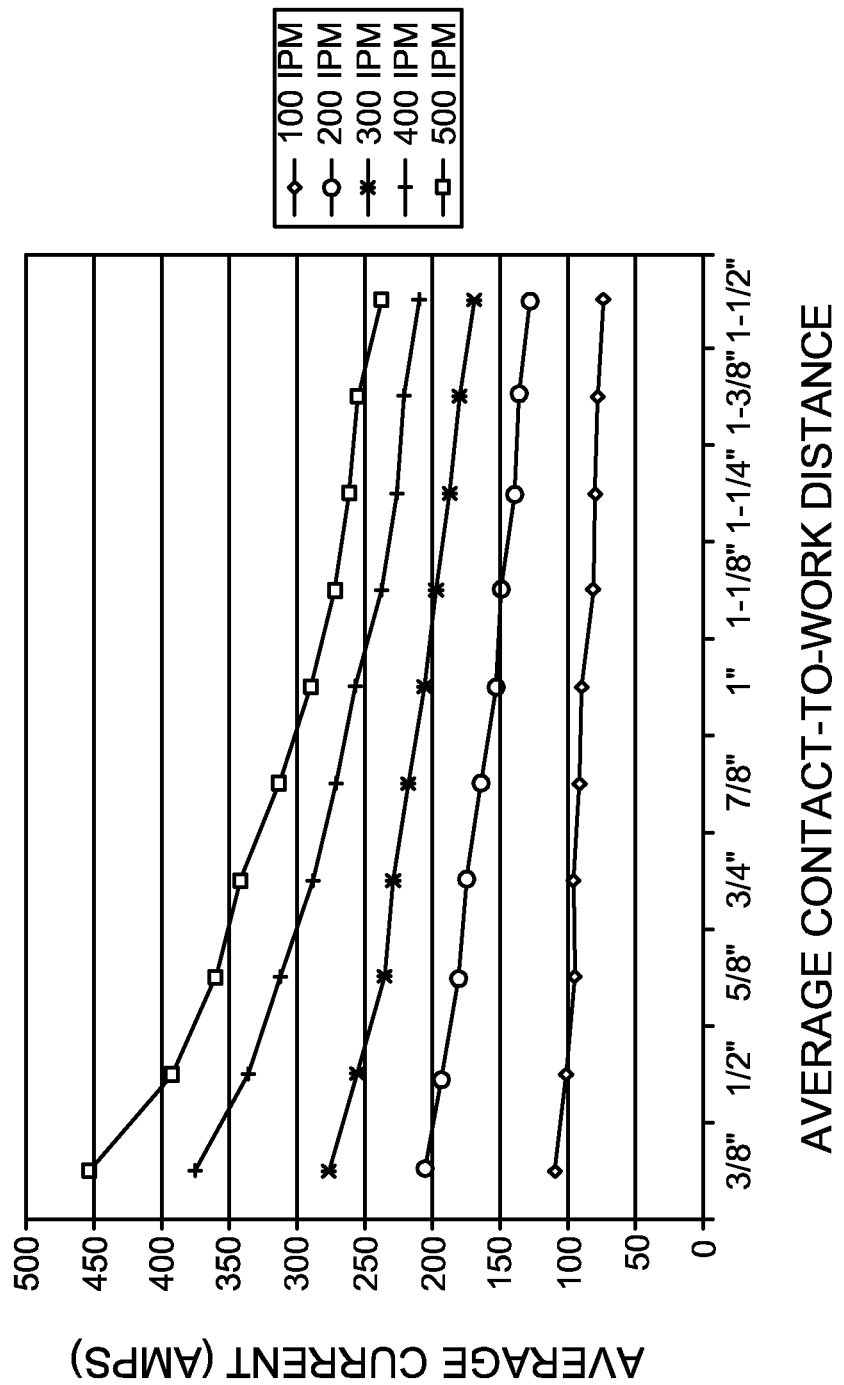
FIG. 10 is a graphical depiction of the relationship between wire feed speed (WFS–inches per minute), contact tip to work distance ("CTWD") and welding current.

As illustrated in FIG. 10, fixed retract times and/or fixed retract distances do not adapt to changing contact-to-work distance variations. The dynamic solution, which takes into account at least one of the following, namely, arc current, wire size, wire speed, burnback time and/or process tip to determine the amount of wire that is protruding from the opening of the welding gun, (or combinations of at least the above parameters) offer advantages not achievable with a static solution. Regardless of the wire stickout position (ESO) when the welding operation stops, the wire preferably retracts to the point where it is positioned either proximate the welding gun tip or between the tip and the nozzle. If the wire retracts too far, the next weld may be delayed until a proper contact-to-work distance is achieved. If the wire does not retract far enough, the wire will protrude from the gun assembly for a distance which may not achieve all of the safety aspects of this invention. FIG. 10 further illustrates the interactivity between welding current, and contact-to-work distance for a given diameter welding wire at various wire feed rates. This relationship can be defined for any combination of variables, accounting for the impact of welding material differences. The retraction amount can employ either a mathematical equation based on the curves represented by FIG. 10, or by interpolating from data table values or combinations thereof.

Further using FIG. 10 as an illustrative non-limiting example, a user welding at an average welding current of 200 amps and using a welding wire feed rate of 300 in/min, would have the software automatically determine that the contact-to-work distance on average would be approximately 1.125" assuming proper welding procedures were being employed. Therefore, a retraction distance of between approximately 1-1.125 inches would be appropriate for the retraction distance, an electrode stick out of approximately 0.125 inches not being sufficient to penetrate a welder's apparel after completion of a welding operation and any subsequent contact with a welding tip.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. An automatic wire retract method comprising:
providing a manual welding apparatus having at least a welding power source, a wire feeder configured to supply a welding wire, and a welding gun having a trigger and an opening from which the welding wire extends;
providing an automatic wire retract program having a retract delay time;
configuring the manual welding apparatus to include the automatic wire retract program;
monitoring when the trigger is enabled to extend the welding wire from the wire feeder to the opening, and extending the welding wire out of the opening of the welding gun;
determining a first amount of time when the trigger is disabled;
determining when the first amount of time is at least equal to the retract delay time, wherein the trigger is disabled during the first amount of time; and
at least partially retracting the welding wire into the opening of the welding gun for a retract distance or a retract time, said step of at least partially retracting dynamically based upon at least one of the following parameters: welding arc current, welding wire size, welding wire feed rate and burnback time.

2. The method of claim 1, wherein
the step of retracting the welding wire into the opening of the welding gun is configured to retract for a retract time; and wherein
the retract time is dynamically adjusted in the automatic wire retract program.

3. The method of claim 1, wherein
the step of retracting the welding wire into the opening of the welding gun is configured to retract for a retract distance; and wherein
the retract distance is dynamically adjusted in the automatic wire retract program.

4. The method of claim 1, wherein
after the step of at least partially retracting into the opening of the welding gun which comprises a nozzle having a nozzle end and a tip, and wherein the welding wire does not extend past the nozzle end.

5. The method of claim 1, wherein
after the step of at least partially retracting into the opening of the welding gun which comprises a nozzle having a nozzle end and a tip, and wherein the welding wire retracts inside the nozzle end.

6. The method of claim 1, wherein
after the step of at least partially retracting into the opening of the welding gun which comprises a nozzle having a nozzle end and a tip, the welding wire extends beyond a nozzle end, but less than an electrode stick out distance during welding.

7. The method of claim 1, wherein
after the step of at least partially retracting into the opening of the welding gun which comprises a tip, the welding wire does not extend past the tip.

8. The method of claim 1, wherein
after the step of at least partially retracting into the opening of the welding gun which comprises a nozzle having a nozzle end and a tip, the welding wire retracts inside the tip.

9. The method of claim 1, wherein
after the step of at least partially retracting into the opening of the welding gun which comprises a nozzle having a nozzle end and a tip, the welding wire extends beyond a tip, but less than an electrode stick out distance during welding.

10. The method of claim 1, which further comprises the step of
sensing at least one parameter by at least one sensor configured to indicate an end of the welding wire, wherein said at least one sensor parameter and the step of at least partially retracting are configured to determine when the retracting step is complete.

11. A method comprising:
providing a manual welding apparatus configured to supply a welding wire to a welding gun, wherein the welding gun has a trigger and an opening where the welding wire extends when the trigger is activated;
providing a computer with a user interface that includes an automatic wire retract program;
monitoring the welding gun;
determining when the trigger is in either an enabled or disabled position during said step of monitoring;
performing a comparison using configuring the automatic wire retract program to indicate when a first condition is satisfied after determining that said trigger is in a disabled position; and
at least partially retracting the welding wire after said comparison, said step of at least partially retracting dynamically based upon at least one of the following parameters: welding arc current, welding wire size, welding wire feed rate and burnback time.

12. The method of claim 11, wherein
the first condition is a dynamically adjusted retract delay time.

13. The method of claim 12, further including the steps of
determining a first amount of time when the trigger is disabled, and further
determining when the first amount of time is at least equal to the retract delay time.

14. The method of claim 13, further comprising
at least one sensor and
configuring the user interface to include the retract delay time and a dynamic sensor parameter for at least one sensor, wherein the at least one sensor is configured to indicate an end of the welding wire, wherein the sensor parameter and the step of at least partially retracting are configured to indicate when to stop the retracting step.

15. The method of claim 11, wherein
the opening of the welding gun comprises a nozzle having a nozzle end and a tip, wherein
the welding wire does not extend past the nozzle end by the end of the step of at least partially retracting.

16. The method of claim 11, wherein
the opening of the welding gun comprises a tip, wherein
the welding wire retracts inside the tip by the end of the step of at least partially retracting.

17. The method of claim 11, wherein
the opening of the welding gun comprises a tip, wherein
the welding wire retracts to a distance which is less than the contact tip to work distance or electrode stick out distance by the end of the step of at least partially retracting.

18. A method to improve the safety of a welding operation using a welding torch which employs a trigger to advance a welding wire, comprising the steps of:
- depressing said trigger to advance said welding wire to initiate a welding operation;
- releasing said trigger to stop said advancement of said welding wire;
- detecting that said trigger is in a released position;
- waiting for a first period of time;
- comparing said first period of time to a predefined waiting time;
- at least partially retracting automatically said welding wire when said first period of time exceeds said predefined waiting time; and
- continuing said step of at least partially retracting automatically for a second period of time, said step of continuing said step of at least partially retracting automatically is dynamically based upon at least one of the following parameters: welding arc current, welding wire size, welding wire speed and burnback time.

19. A method for a welding operation using a welding torch which employs a trigger to advance a welding wire, comprising the steps of:
- depressing said trigger to advance said welding wire to initiate a welding operation;
- releasing said trigger to stop said advancement of said welding wire;
- detecting that said trigger is in a released position;
- at least partially retracting automatically said welding wire after detecting that said trigger is in a released position; and
- said step of at least partially retracting automatically is dynamically based upon at least one of the following parameters: welding arc current, welding wire size, welding wire feed rate and burnback time.

20. A welding system comprising:
- a welding power source;
- a wire feeder;
- a welding gun in operative communication with said wire feeder, said welding gun having a means to control said wire feeder;
- an automatic wire retract program in operative communication with said wire feeder, said wire retract program comprising:
  - a detection means for determining when said means to control said wire feeder has communicated a signal to said wire feeder to stop feeding said wire;
  - a comparator for measuring elapsed time between said signal to stop feeding said wire and a present time; and
  - said program operatively communicating a signal to said wire feeder to at least partially retract said wire after said comparator determines that said elapsed time has exceeded a preset time, said step of at least partially retracting dynamically based upon at least one of the following parameters: welding arc current, welding wire size, welding wire feed rate and burnback time.

21. A welding system comprising:
- a welding power source;
- a wire feeder;
- a welding gun in operative communication with said wire feeder, said welding gun having a means to control said wire feeder;
- an automatic wire retract program in operative communication with said wire feeder, said wire retract program comprising:
  - a detection means for determining when said means to control said wire feeder has communicated a signal to said wire feeder to stop feeding said wire; and
  - said program operatively communicating a signal to said wire feeder to at least partially retract said wire after said wire feeder has stopped feeding said wire, said wire retract program retracting dynamically for a distance which approximates an electrode stick out distance based upon at least one of the following parameters: welding arc current, welding wire size, welding wire feed rate and burnback time.

22. A welding system comprising:
- a welding power source;
- a wire feeder;
- a welding gun in operative communication with said wire feeder, said welding gun having a means to control said wire feeder;
- an automatic wire retract program in operative communication with said wire feeder, said wire retract program comprising:
  - a detection means for determining when said means to control said wire feeder has communicated a signal to said wire feeder to stop feeding said wire; and
  - said program operatively communicating a signal to said wire feeder to at least partially retract said wire after said signal to said wire feeder to stop feeding said wire after a predefined time, said step of at least partially retracting dynamically based upon at least one of the following parameters: welding arc current, welding wire size, welding wire feed rate and burnback time.

* * * * *